United States Patent
Glen

(10) Patent No.: US 12,437,732 B2
(45) Date of Patent: Oct. 7, 2025

(54) DISPLAY WALL SYNCHRONIZATION USING VARIABLE REFRESH RATE MODULES

(71) Applicant: ATI TECHNOLOGIES ULC, Markham (CA)

(72) Inventor: David I. J. Glen, Markham (CA)

(73) Assignee: ATI TECHNOLOGIES ULC, Markham (CA)

( * ) Notice: Subject to any disclaimer, the term of this patent is extended or adjusted under 35 U.S.C. 154(b) by 507 days.

(21) Appl. No.: 17/135,346

(22) Filed: Dec. 28, 2020

(65) Prior Publication Data

US 2022/0208145 A1    Jun. 30, 2022

(51) Int. Cl.
  G09G 5/12    (2006.01)
  G06F 3/14    (2006.01)

(52) U.S. Cl.
  CPC ............. G09G 5/12 (2013.01); G06F 3/1446 (2013.01); *G09G 2300/026* (2013.01); *G09G 2310/08* (2013.01); *G09G 2320/10* (2013.01); *G09G 2370/02* (2013.01)

(58) Field of Classification Search
  CPC ............. G09G 5/12; G09G 2340/0435; G09G 2310/08; G09G 2320/10; G09G 2370/02; G09G 2300/026; G06F 3/1446; G06F 3/1438; H04N 5/04
  See application file for complete search history.

(56) References Cited

U.S. PATENT DOCUMENTS

| | | | |
|---|---|---|---|
| 6,181,300 B1 * | 1/2001 | Poon | G09G 5/366 345/698 |
| 7,889,191 B2 * | 2/2011 | Simpson | H04N 21/43072 345/204 |
| 10,049,642 B2 | 8/2018 | Ansari | |
| 2004/0075621 A1 * | 4/2004 | Shiuan | G06F 3/1431 345/1.1 |
| 2012/0007794 A1 * | 1/2012 | Bansal | H04L 65/403 345/2.1 |
| 2013/0162680 A1 * | 6/2013 | Perry | A63F 13/53 345/634 |
| 2013/0257752 A1 * | 10/2013 | Tripathi | G09G 3/20 345/545 |

(Continued)

FOREIGN PATENT DOCUMENTS

JP    2018112695    7/2018

OTHER PUBLICATIONS

International Search Report and Written Opinion mailed Apr. 25, 2022 for PCT/IB2021/062214, 9 pages.

(Continued)

*Primary Examiner* — Shaheda A Abdin

(57) ABSTRACT

A processing system synchronizes the display of a frame of video at an array of variable refresh rate (VRR) display modules of a display wall by dynamically adjusting a frequency and phase of the refresh rates of the VRR display modules via network protocols based on a selected master timing signal. The processing system selects a master timing signal and transmits the master timing signal to video processing units (VPUs) that render portions of the frame for display at the VRR display modules. Each VPU adjusts the frequency and phase of the VRR display modules for which it renders portions of the frame based on the master timing signal.

18 Claims, 4 Drawing Sheets

(56) References Cited

U.S. PATENT DOCUMENTS

| | | | |
|---|---|---|---|
| 2014/0020409 A1 | 1/2014 | Rhee et al. | |
| 2014/0307168 A1* | 10/2014 | Law | G09G 5/12 |
| | | | 348/500 |
| 2015/0016071 A1 | 1/2015 | Nishioka et al. | |
| 2015/0340009 A1 | 11/2015 | Loeffler et al. | |
| 2016/0092010 A1* | 3/2016 | Agarwal | G06F 3/0412 |
| | | | 345/173 |
| 2016/0357493 A1* | 12/2016 | Zerwas | G06F 3/1438 |
| 2018/0174551 A1* | 6/2018 | Ansari | G09G 5/12 |
| 2019/0371271 A1 | 12/2019 | Morris et al. | |
| 2021/0093959 A1* | 4/2021 | Cerny | A63F 13/77 |
| 2021/0099713 A1* | 4/2021 | Cerny | H04N 19/114 |

OTHER PUBLICATIONS

International Preliminary Report on Patentability mailed Jul. 13, 2023 for PCT/IB2021/062214), 7 pages.

Extended European Search Report mailed Sep. 27, 2024 for App. No. 21914821.0, 16 pages.

\* cited by examiner

DISPLAY WALL SYNCHRONIZATION USING VARIABLE REFRESH RATE MODULES

BACKGROUND

Display walls are commonly used in advertising and in television and film production. Display walls include an array of display modules (also frequently referred to as "display panels"), each of which displays a portion of a frame, such that the array of display modules together displays a complete frame and produces a larger viewing area than any single display panel. In order to synchronize the display of a frame across each of the display modules, the display modules of a display wall are typically connected to each other and to an external reference ("house sync") signal that generates a common time base for the display modules via coaxial cables. In addition, each of the display modules includes a house sync receiver that receives the house sync signal and synchronizes the pixel clock generation in each video processing unit that drives the fixed refresh rate display modules. If the display modules lose synchronization, visual problems with motion or image tearing often will result.

BRIEF DESCRIPTION OF THE DRAWINGS

The present disclosure is better understood, and its numerous features and advantages made apparent to those skilled in the art, by referencing the accompanying drawings. The use of the same reference symbols in different drawings indicates similar or identical items.

DETAILED DESCRIPTION

Figure 1:
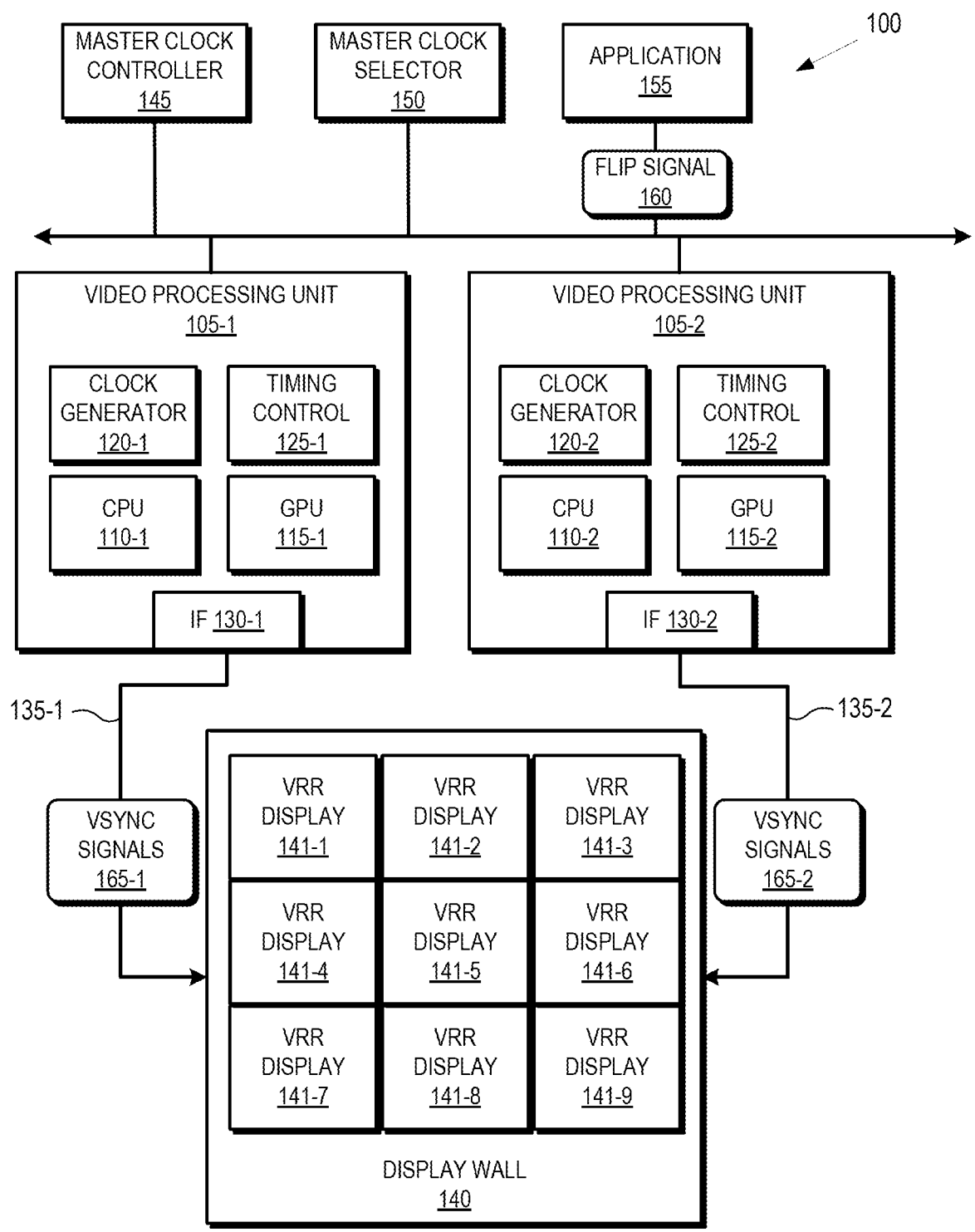
FIG. 1 is a block diagram of a processing system including a plurality of video processing units dynamically synchronizing display of frames of video at a plurality of variable refresh rate display modules of a display wall in accordance with some embodiments.

FIGS. 1-4 illustrate systems and techniques for synchronizing display of frames of video at an array of variable refresh rate (VRR) display modules of a display wall by dynamically adjusting a frequency and phase of the refresh rates of the display modules via network protocols based on a selected master timing signal. Each VRR display module is driven by a video processing unit (VPU) that renders or otherwise obtains a portion of the frame for display at each VRR display module. In some embodiments, a single VPU drives multiple VRR display modules and generates a portion of the frame for display at each of the multiple VRR display modules. For larger display walls incorporating a larger number of VRR display modules, multiple VPUs each drive multiple VRR display modules, with each VPU rendering a portion of the frame for display at each of the multiple VRR display modules. For example, a processing system having a display wall including nine VRR display modules may include two VPUs—one to drive four VPUs and the other to drive the remaining five VPUs. Each VRR display module displays a portion of a frame such that the VRR display modules of the array together display the full frame. While a rendering-based context is used as an example, reference herein to "rendering" also can refer to any other method of obtaining or generating portions of a frame to be displayed, such as via decoding, unless otherwise noted.

The processing system selects a master timing signal and transmits the master timing signal to the VPUs that render portions of the frame for display at the VRR display modules of the display wall. As used herein, the term "portion of the frame" refers to an image to be displayed at a corresponding VRR display module, such that the display by each VRR display module of the display wall of its respective image causes the display wall to display the entire frame. Thus, for a display wall including nine VRR display modules, each portion of the frame is an image of $1/9^{th}$ of the frame. In some embodiments, the processing system selects a timing generator signal of one of the VPUs as the master timing signal. In other embodiments, the processing system selects an external synchronization signal, such as a process that is running at the processing system, an audio reference clock or other system clock, or a network time base ("house sync"), as the master timing signal. Each VPU adjusts the frequency and phase of the VRR display modules for which it renders portions of the frame by adjusting the refresh rate and timing of the VRR display modules for each frame based on the master timing signal. For example, in some embodiments, the VPUs adjust vertical blanking intervals of the VRR display modules to synchronize display of the portions of the frame based on the master timing signal.

Each VPU renders a portion of the frame for each VRR display module to display. When each VPU completes rendering its portions of the frame, each VPU transmits an indication that rendering is complete to a controller for the master timing signal or, in some embodiments, to an application executing at the processing system. In response to receiving the indication, the controller or application transmits a signal such as a "flip" or "present now" command to each of the VPUs. The VPUs then issue a vertical synchronization ("vsync") command to the VRR display modules, indicating an upcoming exit from a vertical blanking period and start of a display cycle.

By adjusting the timing of the exit of each vertical blanking period of each of the VRR display modules of the display wall based on a selected master timing signal, the processing system synchronizes the refresh rates of the VRR display modules via software and network messages without the need to connect the display modules to each other and to an external reference signal such as a house sync via coaxial cables. In addition, the processing system synchronizes the refresh rates of the VRR display modules without the need for a house sync receiver at each VRR display module, reducing the cost and complexity of display wall systems.

As used herein, "synchronized" refers to a relative alignment, within a specified amount of time (an error margin, such as within a few display line periods) of a specific point in display cycles of two or more VRR display modules. For example, in some embodiments, two or more VRR display modules are considered "synchronized" if they begin vertical active periods within a specified amount of time of each other, even if other points in the respective display cycles, such as a beginning of respective vertical blanking periods, are not begun within the specified amount of time of each other, and even if other display cycles, such as every other display cycle for one of the VRR display modules, are not begun within the specified amount of time of each other.

FIG. 1 illustrates a processing system 100 including a plurality of video processing units (VPUs) 105 (such as the illustrated VPUs 105-1, 105-2) dynamically synchronizing display of frames of video at a plurality of variable refresh rate (VRR) display modules 141 (such as the illustrated VRR display modules 141-1, 141-2, 141-3, 141-4, 141-5, 141-6, 141-7, 141-8, 141-9) of a display wall 140 in accordance with some embodiments. The processing system 100 is generally configured to execute sets of instructions (e.g., computer programs) such as software application 155 (referred to as application 155) to carry out specified tasks for an electronic device. Examples of such tasks include controlling aspects of the operation of the electronic device, displaying information to a user to provide a specified user experience, communicating with other electronic devices, and the like. Accordingly, in different embodiments the processing system 100 is employed in one of a number of types of electronic device, such as a desktop computer, laptop computer, server, game console, and the like. It should be appreciated that processing system 100 may include more or fewer components than illustrated in FIG. 1. For example, processing system 100 may include one or more VPUs, one or more input interfaces, non-volatile storage, one or more output interfaces, network interfaces, and more or fewer VRR displays modules or display interfaces.

To support execution of the sets of instructions, the VPUs 105-1, 105-2 each includes at least one memory (not shown), at least one timing generator 120-1, 120-2, at least one timing control module 125-1, 125-2, at least one processor, such as a central processing unit (CPU) 110-1, 110-2, and at least one display interface (IF) 130-1, 130-2. The interfaces 130-1, 130-2 include wired or wireless interconnect interfaces, such as HDMI interfaces, DisplayPort interfaces, embedded DisplayPort (eDP) interfaces, and the like.

In some embodiments, each processor includes one or more instruction pipelines to fetch instructions, decode the instructions into corresponding operations, dispatch the operations to one or more execution units, execute the operations, and retire the operations. In the course of executing instructions, the processors generate graphics operations and other operations associated with the visual display of information. Based on these operations, the processors provide commands and data to one or more parallel processors, such as graphics processing units (GPUs) 115-1, 115-2. The techniques described herein are, in different embodiments, employed at any of a variety of parallel processors (e.g., vector processors, graphics processing units (GPUs), general-purpose GPUs (GPGPUs), non-scalar processors, highly-parallel processors, artificial intelligence (AI) processors, inference engines, machine learning processors, other multithreaded processing units, and the like). FIG. 1 illustrates an example of a parallel processor and, in particular, GPUs 115-1, 115-2, in accordance with some embodiments.

The GPUs 115-1, 115-2 are generally configured to receive the commands and data associated with graphics and other display operations from the CPUs 110-1, 110-2. Based on the received commands, the GPUs 115-1, 115-2 execute operations to generate frames for display. Examples of operations include vector operations, drawing operations, and the like. The rate at which the GPUs 115-1, 115-2 are able to generate frames based on these operations is referred to as the frame generation rate, or simply the frame rate, of the GPUs 115-1, 115-2. It will be appreciated that the frame rates of the GPUs 115-1, 115-2 vary over time, based in part on the complexity of the operations executed by the GPUs 115-1, 115-2 to generate a set of frames. For example, sets of frames requiring a relatively high number of operations (as a result of drawing a relatively large number of moving objects, for example) are likely to result in a lower frame rate, whereas sets of frames requiring a relatively low number of operations are likely to allow for a higher frame rate.

In some embodiments, the GPUs 115-1, 115-2 employ multiple buffering for outputting respective portions of frames to the VRR display modules 141, such that the GPU 115-1, 115-2 is writing a frame to one buffer (referred to as the back buffer) while a current frame is being scanned out from another buffer (referred to as the front buffer). Once the new frame is ready for display, the GPU "flips" the buffer that is being scanned out to the display such that the buffer that had been the back buffer is now the front buffer (i.e., the scan out buffer), and the buffer that had previously been the scan out buffer is now the back buffer (i.e., the buffer to which the GPU writes).

The clock generators 120-1, 120-2 generate one or more clock signals in conjunction with the timing control modules 125-1, 125-2 to synchronize logic operations at the VPUs 105-1, 105-2. The timing control modules 125-1, 125-2 set the frequencies for the clock signals generated by the clock generators 120-1, 120-2. The clock generators 120-1, 120-2 are configured to receive a set of signals from the timing control modules 125-1, 125-2 and a set of base clock signals generated by a phase locked loop (PLL) based on a reference clock signal (not shown) from a crystal oscillator (not shown). The clock generators 120-1, 120-2 combine the base signals to generate a clock signal at a frequency indicated by the received signals from the timing control modules 125-1, 125-2. The clock generators 120-1, 120-2 and the timing control modules 125-1, 125-2 are implemented as hard-coded or programmable logic, one or more processors executing software/firmware instructions, or any combination thereof.

The display wall 140 includes an array of variable refresh rate (VRR) display modules 141-1, 141-2, 141-3, 141-4, 141-5, 141-6, 141-7, 141-8, 141-9 (collectively referred to as VRR display modules 141). Each VRR display module 141 receives portions of rendered frames from one of the VPUs 105-1, 105-2. For example, in some embodiments, VPU 105-1 generates portions of rendered frames and outputs one portion to each of VRR display modules 141-1, 141-2, 141-3, 141-4, while VPU 105-2 generates portions of rendered frames and outputs one portion to each of VRR display modules 141-5, 141-6, 141-7, 141-8, 141-9 such that when each of the VRR display modules 141 displays its received rendered portions of a frame, the entire frame (image) is displayed across all of the VRR display modules 141 of the display wall 140. Each VRR display module 141 includes a display panel and synchronizes refreshing the display panel with the generation of frames at the GPU 115-1, 115-2 from which the VRR display module 141 receives rendered frames such that the refresh rates of the display panels are variable. For example, by adjusting a vertical blanking interval of the display panels, the GPUs 115-1, 115-2 can ensure that the display panels are refreshed only after a new frame is fully written and is ready for display at all display panels of the display wall 140.

As a general operational overview, the CPUs 110-1, 110-2 and GPUs 115-1, 115-2 render a video stream including a series of display frames and corresponding metadata and transmit this video stream to the VRR display modules 141 via the display interfaces 130-1, 130-2 and interconnects 135-1, 135-2. At each of the display modules 141, a display controller (not shown) receives each display frame and corresponding metadata in turn and processes the display frame for display in sequence at display panels of the VRR display modules 141 during a corresponding frame period. As will be appreciated by one skilled in the art, the VRR display modules 141 are generally configured to display the most recent frame generated by the corresponding GPUs 115-1, 115-2 by refreshing the display panels using the pixel data that the VRR display modules 141 receive from the corresponding GPUs 115-1, 115-2.

Each frame generated by the GPUs 115-1, 115-2 includes a vertical active region and a vertical blanking region. The vertical active region includes pixel data that make up the image to be displayed at the display panels of the VRR display modules 141. The vertical blanking region includes metadata such as audio packets or information indicating how the VRR display modules 141 are to interpret the pixel data. During the period of time in which the display controllers read the vertical blanking region (referred to as the vertical blanking interval), the display panels display the image that was last transmitted by the GPUs 115-1, 115-2 in the previous vertical active region. The VRR display modules 141 are configured to have a blanking interval of variable length that is programmable by the VPUs 105-1, 105-2. Accordingly, in some embodiments, VPUs 105-1, 105-2 adjust the refresh rates of the VRR display modules 141 by programming different lengths for the blanking intervals.

To facilitate the synchronization of the display of portions of a frame by each of the VRR display modules 141 of the display wall 140, the processing system 100 uses a software process to frequency and phase align all of the VRR display modules 141 to within a threshold number of display line periods without additional hardware such as a house sync receiver for each VRR display module 141 or coaxial cables to interconnect the VPUs 105-1, 105-2. The processing system includes a master clock selector 150 to select a master timing signal for the VPUs 105-1, 105-2. The master clock selector 150 is implemented as hard-coded or programmable logic, one or more processors executing software/firmware instructions, or any combination thereof. In some embodiments, the master clock selector 150 is incorporated in the application 155. In some embodiments, the master clock selector 150 selects as the master timing signal a clock signal generated by one of the clock generators 120-1, 120-2. In other embodiments, the master clock selector 150 selects an external synchronization signal such as a house sync receiver or a process (not shown) that is running at the processing system 100 or a network time base (not shown) as the master timing signal.

A master clock controller 145 for the master clock selector 150 transmits the master timing signal to the VPUs 105-1, 105-2 with an indication that the VPUs 105-1, 105-2 are to use the master timing signal to synchronize logic operations at the VPUs 105-1, 105-2. The master clock controller 145 is implemented as hard-coded or programmable logic, one or more processors executing software/firmware instructions, or any combination thereof. In some embodiments, the master clock controller 145 is incorporated as sets of instructions in the application 155. In some embodiments in which a clock signal generated by one of the clock generators 120-1, 120-2 is selected as the master clock signal, the master clock controller is the timing control 125-1, 125-2 for the clock generator 120-1, 120-2 whose clock signal was selected. Each VPU 105-1, 105-2 adjusts the frequency and phase of the VRR display modules 141 for which it renders portions of the frame by adjusting the refresh rate and timing of the VRR display modules 141 based on the master timing signal, for example, by adjusting the vertical blanking intervals of the VRR display modules 141 to synchronize display of the portions of the frame based on the master timing signal.

To illustrate, in operation, each VPU 105-1, 105-2 renders a portion of the frame for corresponding ones of the VRR display modules 141 to display. When each of the VPUs 105-1, 105-2 completes rendering its portions of the frame, the VPUs 105-1, 105-2 each transmit an indication that rendering is complete to the master clock controller 145 for the master timing signal. In response to the master clock controller 145 (or 125-1, 125-2) receiving the indication, the application 155 transmits a flip signal 160 to each of the VPUs 105-1, 105-2 to issue a vertical sync ("vsync") command to the VRR display modules 141, exit a vertical blanking period and flip buffers at the GPUs 115-1, 115-2, indicating the start of a display cycle for displaying the rendered portions of the frame. In some embodiments, the flip signal 160 is generated by one or more of the VPUs 105-1, 105-2, such as by generating a flip signal 160 in hardware logic when the last of the VPUs 105-1, 105-2 indicates that it has completed rendering its portion of the frame.

In other embodiments, the flip signal 160 is generated by another source, such as a timing controller 125-1, 125-2, or the operating system (not shown). In response to receiving the flip signal 160, the VPUs 105-1, 105-2 each issue vsync commands 165-1, 165-2 to their respective VRR display modules 141 via interfaces 130-1, 130-2 and interconnects 135-1, 135-2. Simultaneous (or near simultaneous) issuance of the vsync commands 165-1, 165-2 by the VPUs 105-1, 105-2 effectively synchronizes the frequencies and phases of the display cycles of each of the VRR display modules 141 based on the master timing signal to within a few display line periods, which is a difference that is not perceptible by the human eye.

Figure 2:
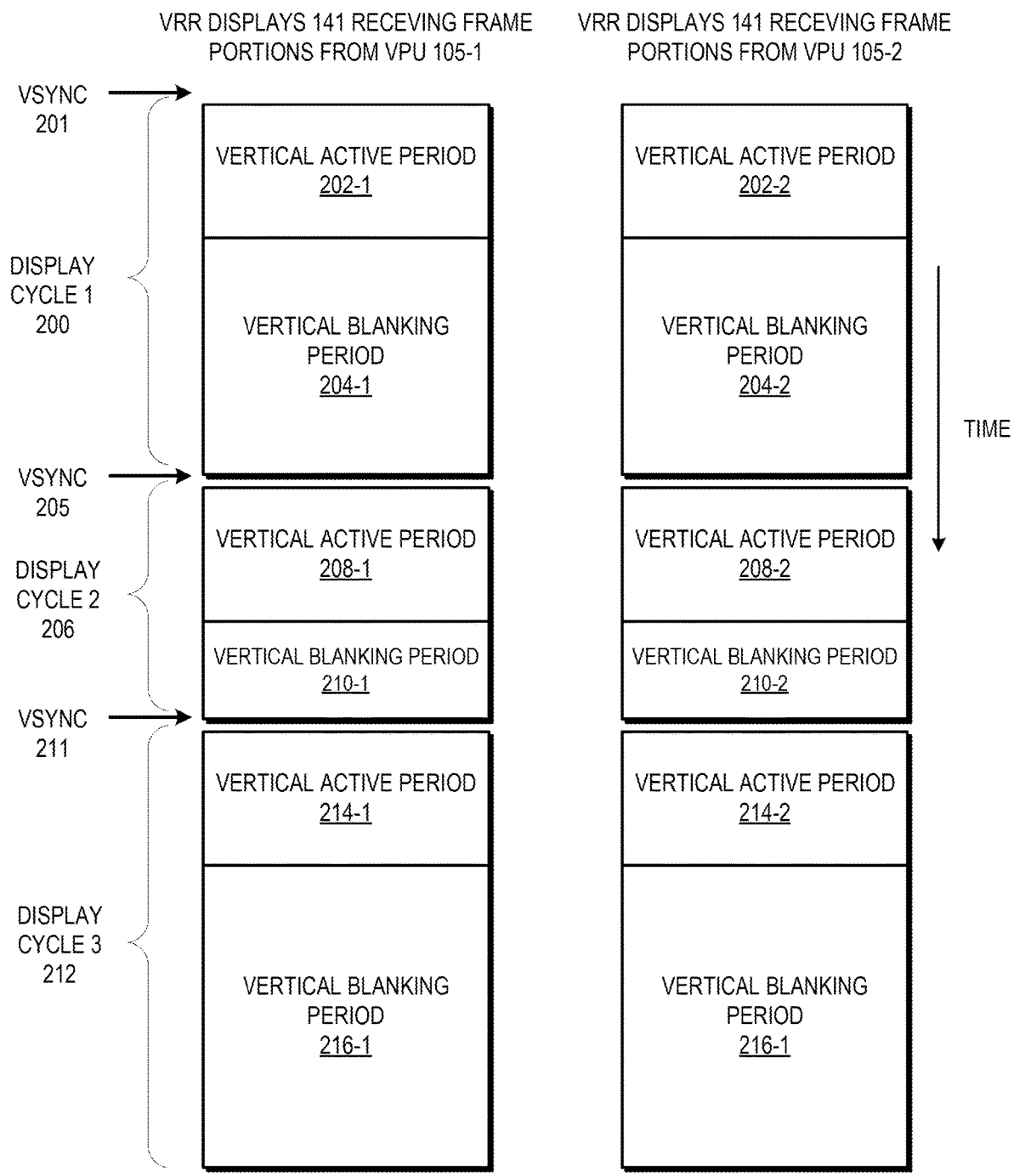
FIG. 2 is a block diagram of dynamically synchronized variable refresh rate display cycles in accordance with some embodiments.

FIG. 2 is a block diagram of dynamically synchronized variable refresh rate display cycles in accordance with some embodiments. The vertical blanking period includes three phases: a vertical front porch (vfront), vertical sync (vsync), and vertical back porch (vback). A vertical refresh rate changes the duration of vfront, but vsync and vback typically remain unchanged. Vsync is the synchronization event across VPUs that terminates the variable length of vfront. At a fixed time after vfront terminates, the vertical active period begins on all VPUs.

To illustrate, at the start of a display cycle 1 200 occurring a fixed time after assertion of vsync 201, vertical active periods 202-1, 202-2 begin, during which the pixel data for the portions of the frame to be displayed during the display cycle 1 200 is scanned out of a frame buffer of each of the VPUs 105-1, 105-2 on a row-by-row basis and transmitted to the respective VRR display modules 141, whereupon each VRR display module 141 configures a corresponding row of a pixel matrix composed of, for example, a matrix of liquid crystals (LCs), light emitting diodes (LEDs) or organic LEDs (OLEDs), based on the pixel data of the row of the portion of the frame currently being scanned in. The VRR display modules 141 cause the display of the portions of the frame through the emission of display light that is modulated at each pixel in accordance with the pixel data associated with that pixel's location.

After all rows of the portions of the frame have been displayed, vertical blanking periods 204-1, 204-2 occur. The VRR display modules 141 do not scan in new video information during the blanking periods. Each frame portion generated by the GPUs 115-1, 115-2 includes a vertical active region and a vertical blanking region. The vertical active region includes pixel data that make up the image to be displayed at the display panels. The vertical blanking region includes metadata such as audio packets or information indicating how the VRR display modules 141 are to interpret the pixel data. During the period of time in which a display controller of each VRR display module 141 reads the vertical blanking region (referred to as the vertical blanking interval or vertical blanking period), the display panel displays the image that was last transmitted by the GPU 115-1, 115-2 in the previous vertical active region. Each of the VRR display modules 141 is configured to have a blanking interval of variable length that is programmable by the GPUs 115-1, 115-2.

Assertion of vsync 205 signals the end of the vfront phase of the vertical blanking periods 204-1, 204-2, a fixed period after which display cycle 2 206 begins. Vertical active periods 208-1, 208-2 begin, during which the pixel data for the portions of the frame to be displayed during the display cycle 2 306 is scanned out of the frame buffers of the VPUs 105-1, 105-2 on a row-by-row basis and transmitted to the respective VRR display modules 141, whereupon each VRR display module 141 configures a corresponding row of a pixel matrix based on the pixel data of the row of the portion of the frame currently being scanned in. The VRR display modules 141 cause the display of the portions of the frame through the emission of display light that is modulated at each pixel in accordance with the pixel data associated with that pixel's location. After all rows of the portions of the frame have been displayed, vertical blanking periods 210-1, 210-2 occur.

Vsync 211 signals the end of the vfront phases of vertical blanking periods 210-1, 210-2, a fixed period after which display cycle 3 212 begins. Vertical active periods 214-1, 214-2 begin, during which the pixel data for the portions of the frame to be displayed during the display cycle 3 212 is scanned out of the frame buffers of the VPUs 105-1, 105-2 on a row-by-row basis and transmitted to the respective VRR display modules 141, whereupon each VRR display module 141 configures a corresponding row of a pixel matrix based on the pixel data of the row of the portion of the frame currently being scanned in. The VRR display modules 141 cause the display of the portions of the frame through the emission of display light that is modulated at each pixel in accordance with the pixel data associated with that pixel's location. After all rows of the portions of the frame have been displayed, vertical blanking periods 216-1, 216-2 occur.

As illustrated in FIG. 2, the display cycles 200, 206, 212 are synchronized across the VRR display modules 141 based on the synchronized assertion of vsyncs 201, 205, 211, which determine the respective durations of the vertical blanking periods 204-1 and 204-2, 210-1 and 210-2, and 216-1 and 216-2. The vertical blanking periods associated with each of the display cycles have durations that differ from one another; however, the vertical blanking periods for each of the VRR display modules 141 for a given display cycle are synchronous.

Figure 3:
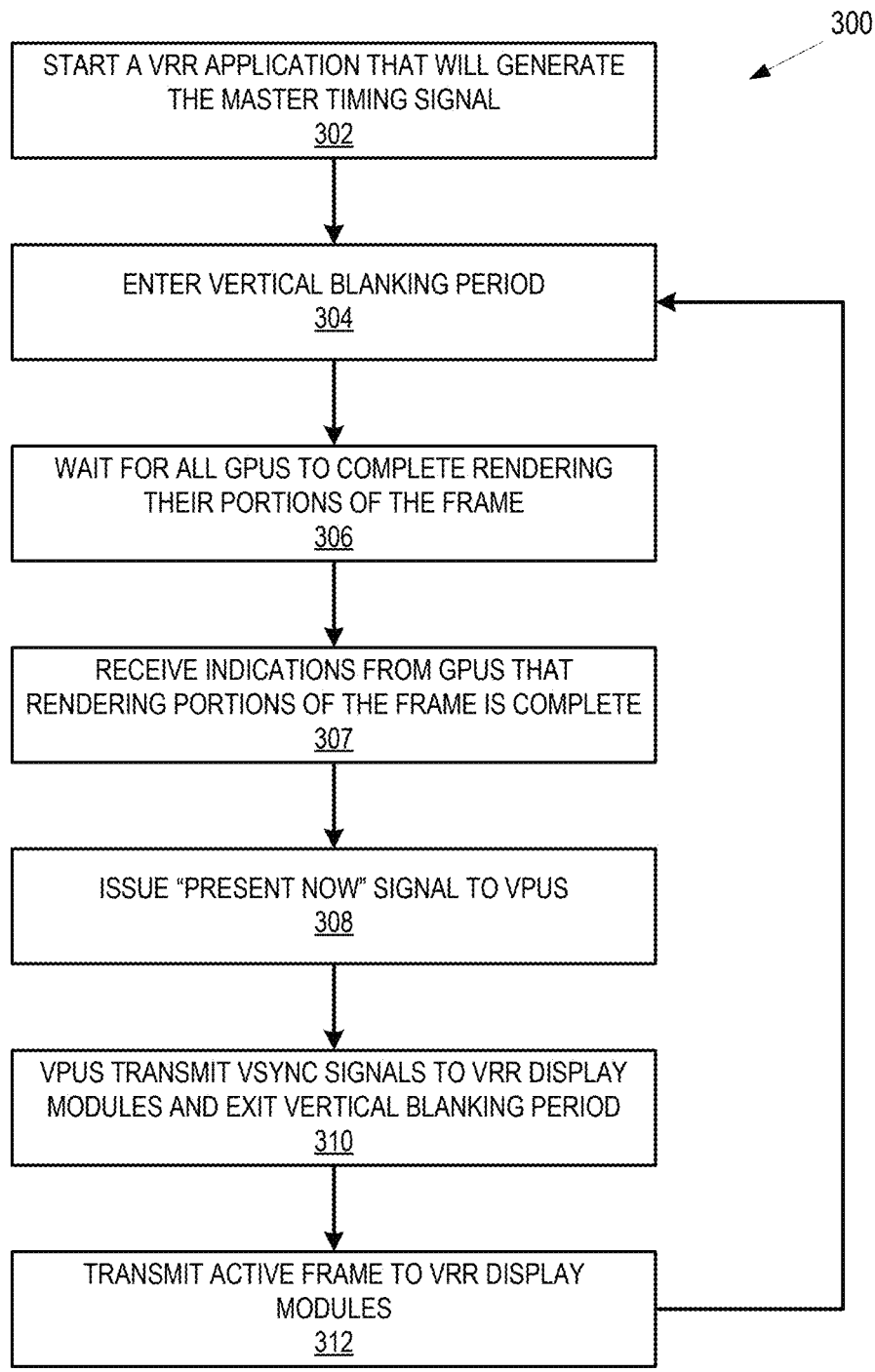
FIG. 3 is a flow diagram illustrating a method for dynamically synchronizing display of a frame at a plurality of variable refresh rate display modules of a display wall based on a timing generator signal of a video processing unit in accordance with some embodiments.

FIG. 3 is a flow diagram illustrating a method 300 for dynamically synchronizing display of a frame generated by a plurality of VPUs for display at a plurality of variable refresh rate display modules of a display wall in accordance with some embodiments. Method 300 is implemented in a processing system such as processing system 100 of FIG. 1. In some embodiments, method 300 is initiated by one or more processors in response to one or more instructions stored by a computer-readable storage medium.

At block 302, the processing system 100 starts a variable refresh rate application 155 that will generate the master timing signal to synchronize logic operations of the VPUs 105-1, 105-2 based on the frame rate of the slowest VPU 105-1, 105-2 for each frame. For example, in some embodiments, the application 155 is a game that displays frames at the rate of the VPU 105-1, 105-2 that takes the longest to render its portion of each frame. Which VPU 105-1, 105-2 is the slowest can change from one frame to the next. For example, if a complicated object that takes more rendering time moves to a different area of the frame and therefore to a different VPU, the VPU 105-1, 105-2 that renders the complicated object can change on a frame-to-frame basis.

At block 304, the VRR display modules 141 enter a vertical blanking period. At block 306, the application 155 waits for all of the GPUs 115-1, 115-2 to indicate that rendering of their respective portions of the current frame is complete. For example, in some embodiments, the application 155 periodically checks to determine whether it has received indications from each of the GPUs 115-1, 115-2 that rendering of their respective portions of the current frame is complete. At block 307, the application 155 receives indications from the GPUs 115-1, 115-2 that rendering of their respective portions of the current frame is complete.

Once the application 155 determines that all of the VPUs have indicated that rendering of their respective portions of the current frame is complete, the method flow continues to block 308. At block 308, the application 155 issues a "present now" or "flip" signal to the VPUs 105-1, 105-2 via network message that acts as a master timing signal. At block 310, in response to receiving the "present now" or "flip" signal, each of the VPUs 105-1, 105-2 transmit vsync signals to the VRR display modules 141 for which their respective GPUs 115-1, 115-2 have rendered portions of the frame, signaling the end of the vfront phase of the vertical blanking period. At a fixed time after receiving the vsync signals, the VRR display modules 141 exit the vertical blank period. At block 312, the VPUs 105-1, 105-2 transmit their respective portions of the next active frame to their corresponding VRR display modules 141. The method flow then continues back to block 304 with the VRR display modules 141 entering a vertical blanking period.

Figure 4:
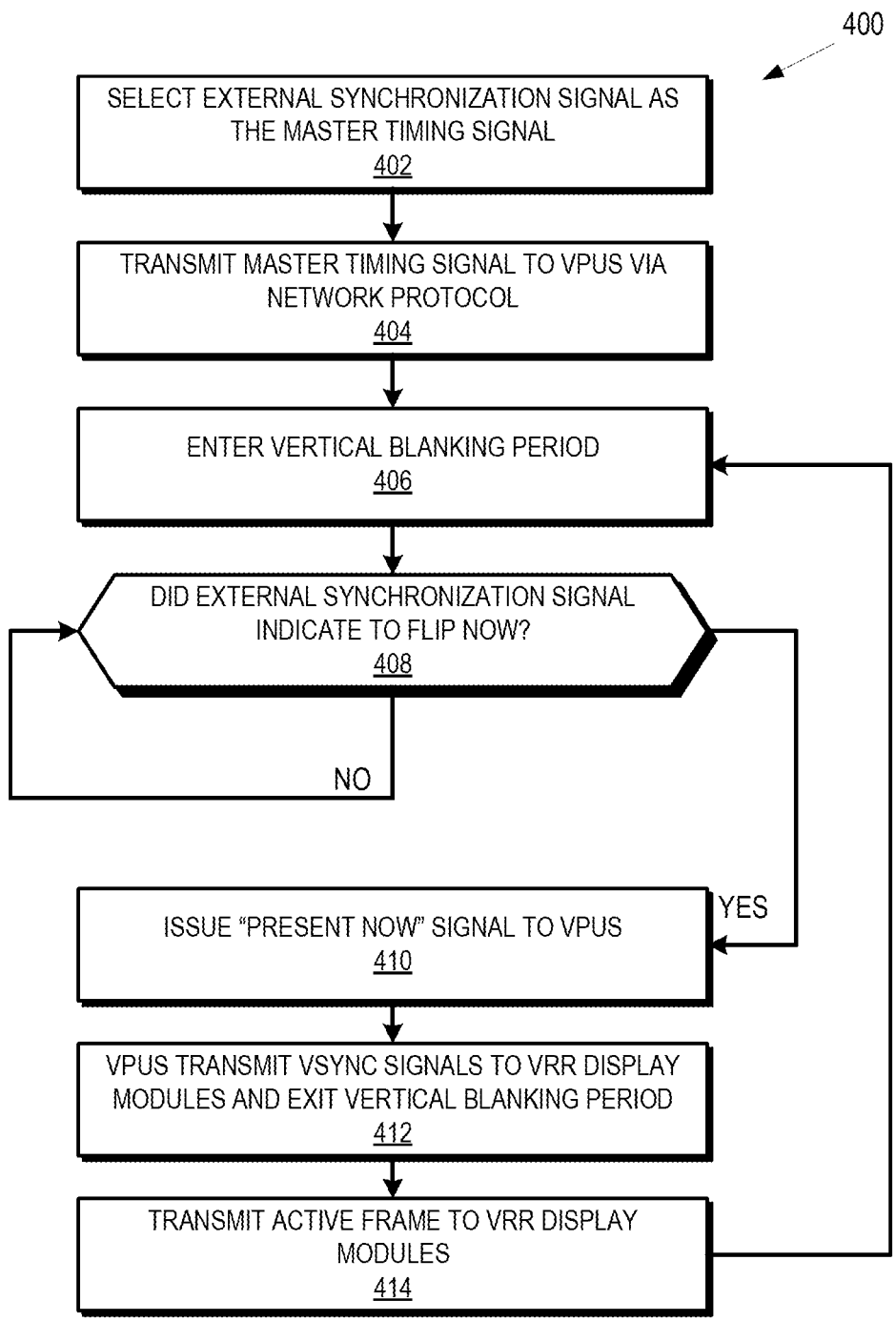
FIG. 4 is a flow diagram illustrating a method for dynamically synchronizing display of a frame at a plurality of variable refresh rate display modules of a display wall based on an external synchronization signal in accordance with some embodiments.

FIG. 4 is a flow diagram illustrating a method 400 for dynamically synchronizing display of a frame generated by a plurality of GPUs for display at a plurality of variable refresh rate display modules of a display wall in accordance with some embodiments. Method 400 is implemented in a processing system such as processing system 100 of FIG. 1. In some embodiments, method 400 is initiated by one or more processors in response to one or more instructions stored by a computer-readable storage medium.

At block 402, the master clock selector 150 selects an external synchronization signal as the master timing signal to synchronize logic operations of the VPUs 105-1, 105-2. In some embodiments, the external synchronization signal is derived from a video camera or a process that is running at the processing system 100 or a network time base. At block 404, the master clock controller 145 for the master clock selector 150 transmits the master timing signal via network messages to the VPUs 105-1, 105-2 with an indication that the VPUs 105-1, 105-2 are to use the master timing signal to synchronize logic operations at the VPUs 105-1, 105-2. At block 406, the VRR display modules 141 enter a vertical blanking period. At block 408, the master clock controller 145 (or, in some embodiments, the application 155) determines whether the external synchronization signal has indicated that the VRR display modules 141 are to flip now. If, at block 408, the master clock controller 145 determines that the external synchronization signal has not indicated that the VRR display modules 141 are to flip now, the method flow continues back to block 408.

If, at block 408, the master clock controller 145 determines that the external synchronization signal has indicated that the VRR display modules 141 are to flip now, the method flow continues to block 510. At block 410, the application 155 issues a "present now" or "flip" signal to the VPUs 105-1, 105-2. At block 412, in response to receiving the "present now" or "flip" signal, each of the VPUs 105-1, 105-2 transmit vsync signals to the VRR display modules 141 for which their respective GPUs 115-1, 115-2 have rendered portions of the frame and the VRR display modules 141 exit the vertical blanking period. At block 414, the VPUs 105-1, 105-2 transmit their respective portions of the next active frame to their corresponding VRR display modules 141. The method flow then continues back to block 506 with the VRR display modules 141 entering a vertical blanking period.

In some embodiments, the apparatus and techniques described above are implemented in a system including one or more integrated circuit (IC) devices (also referred to as integrated circuit packages or microchips), such as the processing system 100 described above with reference to FIGS. 1-4. Electronic design automation (EDA) and computer aided design (CAD) software tools may be used in the design and fabrication of these IC devices. These design tools typically are represented as one or more software programs. The one or more software programs include code executable by a computer system to manipulate the computer system to operate on code representative of circuitry of one or more IC devices so as to perform at least a portion of a process to design or adapt a manufacturing system to fabricate the circuitry. This code can include instructions, data, or a combination of instructions and data. The software instructions representing a design tool or fabrication tool typically are stored in a computer readable storage medium accessible to the computing system. Likewise, the code representative of one or more phases of the design or fabrication of an IC device may be stored in and accessed from the same computer readable storage medium or a different computer readable storage medium.

A computer readable storage medium may include any non-transitory storage medium, or combination of non-transitory storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

In some embodiments, certain aspects of the techniques described above may implemented by one or more processors of a processing system executing software. The software includes one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method comprising:
    transmitting a master timing signal via network messages to a plurality of video processing units (VPUs) of a processing system;
    at each VPU, using the master timing signal to generate a corresponding portion of a frame for display at a corresponding variable refresh rate (VRR) display module of a plurality of VRR display modules of a display wall;
    receiving, at a controller for the master timing signal, an indication from each of the VPUs that generating a portion of the frame is complete; and dynamically adjusting one or both of refresh frequencies and phases of refresh rates of the plurality of VRR display modules based on the master timing signal and the indications.

2. The method of claim 1, further comprising:
selecting as the master timing signal one of: a clock signal generated by of one of the VPUs, an application executing at the processing system, and an external synchronization signal.

3. The method of claim 1, wherein dynamically adjusting comprises:
in response to receiving indications from each of the VPUs, transmitting, at the controller for the master timing signal, a signal to each of the VPUs to transmit a vertical synchronization (vsync) command to each of the VRR display modules.

4. The method of claim 3, wherein dynamically adjusting further comprises:
transmitting, from each of the VPUs, the vsync command to the VRR display modules in response to receiving the signal.

5. The method of claim 4, wherein the VRR display modules exit a vertical blank period after receiving the vsync command.

6. The method of claim 3, wherein the controller for the master timing signal is one of: an application executing at the processing system, a timing controller for one of the VPUs, or an operating system of the processing system.

7. The method of claim 1, further comprising:
displaying, at each of the VRR display modules, a portion of the frame in response to each of the VPUs receiving a signal to present now from an application executing at the processing system.

8. A method comprising:
selecting a master timing signal for a plurality of variable refresh rate (VRR) display modules of a display wall, wherein each VRR display module displays a portion of a frame for the display wall;
receiving, at a controller for the master timing signal, an indication from each of one or more video processing units (VPUs) of a processing system that generating the portion of the frame is complete; and
dynamically adjusting one or both of refresh frequencies and phases of refresh rates of the plurality of VRR display modules based on the indications.

9. The method of claim 8, wherein selecting comprises selecting as the master timing signal one of: a clock signal generated by of one of the VPUs, an application executing at the processing system, and an external synchronization signal.

10. The method of claim 8, further comprising:
synchronizing commands transmitted by one or more of the VPUs with the master timing signal based on the indications and network messages to display the frame, each VPU driving one or more of the display modules.

11. The method of claim 10, wherein synchronizing comprises:
in response to receiving indications from each of the VPUs, transmitting, at the controller for the master timing signal, a signal to each of the VPUs to transmit a vertical synchronization (vsync) command to each of the VRR display modules.

12. The method of claim 11, wherein synchronizing further comprises:
transmitting, from each of the VPUs, the vsync command to the VRR display modules in response to receiving the signal.

13. The method of claim 11, wherein the controller for the master timing signal is one of: an application executing at the processing system, a timing controller for one of the VPUs, or an operating system of the processing system.

14. The method of claim 8, further comprising:
displaying, at each of the VRR display modules, a portion of the frame in response to each of the VPUs receiving a signal to present now from an application executing at the processing system.

15. A system, comprising:
a plurality of variable refresh rate (VRR) display modules comprising a display wall, each display module configured to display a portion of a frame for the display wall; and
a plurality of video processing units (VPUs), each VPU configured to generate one or more portions of the frame for display at one or more of the VRR display modules and to provide an indication that generating the portion of the frame is complete to a controller for a master timing signal and wherein the plurality of VPUs are to dynamically adjust refresh frequencies and phases of the plurality of VRR display modules based on the master timing signal transmitted via network messages to the plurality of VPUs and the indications.

16. The system of claim 15, further comprising:
a software application configured to manipulate at least one processor to select as the master timing signal one of: a clock signal generated by of one of the VPUs, an application executing at the system, and an external synchronization signal.

17. The system of claim 15, wherein the controller is configured to:
transmit a signal to each of the VPUs to transmit a vsync command to each of the VRR display modules in response to receiving the indication.

18. The system of claim 15, further comprising:
a software application configured to:
manipulate at least one processor to select an external synchronization signal as the master timing signal; and
transmit to each of the VPUs a signal to present now, wherein the VRR display modules are configured to display a portion of the frame in response to each of the VPUs receiving the signal to present now from the software application.

* * * * *